(12) United States Patent
Von Novak, III

(10) Patent No.: US 9,924,704 B2
(45) Date of Patent: Mar. 27, 2018

(54) DEVICES AND METHODS FOR HARMONIC POWER CONTROL FOR WIRELESS POWER TRANSMISSION

(71) Applicant: QUALCOMM Incorporated, San Diego, CA (US)

(72) Inventor: William Henry Von Novak, III, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 15/188,708

(22) Filed: Jun. 21, 2016

(65) Prior Publication Data

US 2017/0149284 A1 May 25, 2017

Related U.S. Application Data

(60) Provisional application No. 62/259,852, filed on Nov. 25, 2015.

(51) Int. Cl.
| | |
|---|---|
| *A01K 27/00* | (2006.01) |
| *A41F 9/00* | (2006.01) |
| *H02J 50/80* | (2016.01) |
| *H02J 50/12* | (2016.01) |
| *H02J 50/40* | (2016.01) |

(Continued)

(52) U.S. Cl.
CPC .......... *A01K 27/003* (2013.01); *A01K 27/005* (2013.01); *A01K 27/008* (2013.01); *A41F 9/002* (2013.01); *H02J 7/025* (2013.01); *H02J 50/10* (2016.02); *H02J 50/12* (2016.02); *H02J 50/40* (2016.02); *H02J 50/80* (2016.02)

(58) Field of Classification Search
CPC ...... A41F 9/002; A01K 27/003; A01K 27/005; A01K 27/008; H02J 50/80; H02J 50/12; H02J 50/40; H02J 7/025; H02J 50/10
See application file for complete search history.

(56) References Cited

U.S. PATENT DOCUMENTS

| | | |
|---|---|---|
| 2013/0020988 A1 | 1/2013 | Kim et al. |
| 2014/0159652 A1 | 6/2014 | Hall et al. |

(Continued)

OTHER PUBLICATIONS

International Search Report and Written Opinion—PCT/US2016/058508—ISA/EPO—dated Jan. 26, 2017.

*Primary Examiner* — Robert Deberadinis
(74) *Attorney, Agent, or Firm* — Knobbe, Martens, Olson & Bear, LLP

(57) ABSTRACT

In one aspect, an apparatus for wirelessly transmitting power to a wireless power receiver comprises a transmitter circuit configured to transmit wireless power via a magnetic field at a first frequency and a second frequency, the second frequency different than the first frequency and is an integer multiple of the first frequency. The apparatus further includes a processor circuit configured to detect a presence of multiple wireless power receivers each being capable of receiving power via the magnetic field over at least one of the first and second frequency and further configured to identify frequency charging capabilities of each of the detected wireless power receivers. The transmitter circuit further configured to concurrently transmit wireless power to first and second wireless power receivers at the first frequency and the second frequency, respectively, based on the respective charging capabilities of the first and second wireless power receivers.

30 Claims, 8 Drawing Sheets

(51) Int. Cl.
    *H02J 7/02*     (2016.01)
    *H02J 50/10*    (2016.01)

(56) References Cited

U.S. PATENT DOCUMENTS

| | | |
|---|---|---|
| 2014/0184148 A1 | 7/2014 | Van Der Lee et al. |
| 2014/0266027 A1 | 9/2014 | Telefus |
| 2014/0312833 A1 | 10/2014 | Won et al. |
| 2015/0115729 A1 | 4/2015 | Kanno |
| 2015/0228402 A1 | 8/2015 | Zhong et al. |

# DEVICES AND METHODS FOR HARMONIC POWER CONTROL FOR WIRELESS POWER TRANSMISSION

CROSS REFERENCE TO RELATED APPLICATIONS

This application claims priority benefit under 35 U.S.C. § 119(e) to U.S. Provisional Patent Application No. 62/259, 852 entitled "DEVICES AND METHODS FOR HARMONIC POWER CONTROL FOR WIRELESS POWER TRANSMISSION" filed on Nov. 25, 2015, the disclosure of which is hereby incorporated by reference in its entirety.

FIELD

This application is generally related to wireless power charging of chargeable devices. More particularly, the application relates to devices and methods for using harmonics of a fundamental power frequency to manage power transmission to several devices.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the present disclosure provides an apparatus for wirelessly transmitting power to power or charge a wireless power receiver. In some embodiments, the apparatus comprises a transmitter circuit configured to transmit wireless power via a magnetic field at a first frequency and a second frequency, the second frequency is different than the first frequency and is an integer multiple of the first frequency. The apparatus may further comprise a processor circuit configured to detect a presence of multiple wireless power receivers each being capable of receiving power via the magnetic field at the first and/or second frequency. The processor circuit further configured to identify charging capabilities of each of the detected wireless power receivers. The transmitter circuit further configured to transmit wireless power to a first wireless power receiver of the detected wireless power receivers at the first frequency and transmit wireless power to a second wireless power receiver of the detected wireless power receivers at the second frequency based on the charging capabilities of the first and second wireless power receivers.

In some embodiments, the transmitter circuit may be further configured to transmit wireless power sufficient to power or charge a load of the first and second wireless power receivers. The transmitter circuit may be further configured to generate the magnetic field at one of the first and second frequencies for detecting a radio frequency identification (RFID) device. In some embodiments, the apparatus may further comprise a receiver circuit configured to receive a communication from the detected RFID device in response to the magnetic field provided at one of the first and second frequencies. In various embodiments, the transmitter circuit may comprise a first coil configured to provide the magnetic field at the first frequency and a second coil configured to provide the magnetic field at the second frequency. The transmitter circuit may also comprise a frequency generator configured to electrically sum the first frequency and the second frequency, and provide the magnetic field at the summed frequency. In some embodiments, the transmitter circuit comprises an amplifier configured to provide the magnetic field at the first frequency and the second frequency. The transmitter circuit may also a frequency generator configured to provide the magnetic field at the first frequency and the second frequency based on inducing distortion. The transmitter circuit may further comprise a harmonic generator circuit configured to provide one or more harmonics of the first frequency to provide the magnetic field at the one or more harmonics of the first frequency.

In some embodiments, the processor circuit may be further configured to assign the first frequency to the first wireless power receiver of the detected wireless power receivers based on the frequency charging capability of the first wireless power receiver, and assign the second frequency to the second wireless power receiver of the detected wireless power receivers based on the charging capability of the second wireless power receiver. The processor circuit may be further configured to assign the first frequency to a third wireless power receiver based on the frequency charging capability of the third wireless power receiver, compare a frequency charging capability of the first wireless power receiver with a frequency charging capability of the third wireless power receiver, and assign the second frequency to the first wireless power receiver based on the comparison. In some embodiments, the frequency charging capability of the first wireless power receiver specifies a required received voltage level of the first wireless power receiver and wherein the frequency charging capability of the third wireless power receiver specifies a required received voltage level of the third wireless power receiver.

In some embodiments, the frequency charging capability of the first wireless power receiver may specify one or more frequencies at which the first wireless power receiver is capable of receiving power and wherein the frequency charging capability of the second wireless power receiver specifies one or more frequencies at which the second wireless power receiver is capable of receiving power.

Another aspect of the present disclosure provides a method of wirelessly transmitting power to power or charge a wireless power receiver. The method comprises detecting a presence of multiple wireless power receivers each being capable of receiving power via the magnetic field at a first and/or a second frequency, the second frequency different than the first frequency and is an integer multiple of the first frequency. The method further comprises identifying charging capabilities of each of the detected wireless power receivers. The method further comprises transmitting wireless power via a magnetic field to a first wireless power receiver of the detected wireless power receivers at a first frequency based on the charging capabilities of the first wireless receiver. The method further comprises concurrently transmitting wireless power via the magnetic field to a second wireless power receiver of the detected wireless power receivers at a second frequency based on the charging capabilities of the first and second wireless power receivers.

Another aspect of the present disclosure provides an apparatus for wirelessly transmitting power to power or charge a wireless power receiver. The apparatus comprises means for detecting a presence of multiple wireless power receivers each being capable of receiving power via the magnetic field at a first and/or a second frequency, the second frequency different than the first frequency and is an integer multiple of the first frequency. The apparatus further comprises means for identifying charging capabilities of each of the detected wireless power receivers. The apparatus further comprises means for transmitting wireless power via a magnetic field to a first wireless power receiver of the detected wireless power receivers at a first frequency based on the charging capabilities of the first wireless power receiver. The apparatus further comprises means for concurrently transmitting wireless power via a magnetic field to a second wireless power receiver of the detected wireless power receivers at a second frequency based on the charging capabilities of the second wireless power receiver.

Another aspect of the present disclosure provides a non-transitory computer readable storage medium comprising instructions that when executed cause a processor to perform a method for wirelessly transmitting power to a wireless power receiver. The method comprises detecting a presence of multiple wireless power receivers each being capable of receiving power via a magnetic field at a first and/or a second frequency. The second frequency is different than the first frequency and is an integer multiple of the first frequency. The method further comprises identifying a frequency charging capability for each of the detected wireless power receivers. The instruction further comprise transmitting wireless power via the magnetic field to a first wireless power receiver of the detected wireless power receivers at the first frequency based on the frequency charging capability of the first wireless receiver. The method further comprises concurrently transmitting wireless power via the magnetic field to a second wireless power receiver of the detected wireless power receivers at the second frequency based on the frequency charging capability of the second wireless power receiver.

One aspect of the present disclosure provides an apparatus for wirelessly transmitting power to power or charge a wireless power receiver. In some embodiments, the apparatus comprises a transmitter circuit configured to transmit wireless power via a magnetic field at a first frequency and a second frequency. The second frequency is different than the first frequency and is an integer multiple of the first frequency. The apparatus further comprises a processor circuit configured to detect a presence of multiple wireless power receivers each being capable of receiving power via the magnetic field at the first and/or the second frequency. The transmitter circuit is further configured to transmit wireless power to a first wireless power receiver of the detected wireless power receivers at the first frequency and concurrently transmit wireless power to a second wireless power receiver of the detected wireless power receivers at the second frequency.

Figure 1:
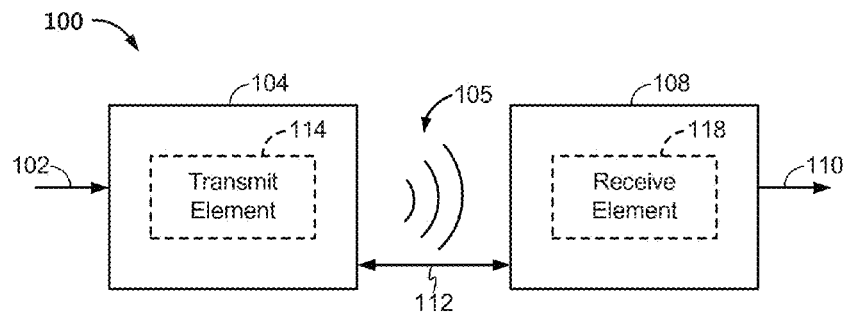
FIG. 1 is a functional block diagram of an exemplary wireless power transfer system, in accordance with exemplary embodiments of the application.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "power receiving element" to achieve power transfer.

FIG. 1 is a functional block diagram of a wireless power transfer system 100, in accordance with an illustrative embodiment. Input power 102 may be provided to a transmitter circuit 104 from a power source (not shown in this figure) to generate a wireless (e.g., magnetic or electromagnetic) field 105 for performing energy transfer. A receiver circuit 108 may couple to the wireless field 105 and generate output power 110 for storing or consumption by a device (not shown in this figure) coupled to the output power 110. The transmitter 104 and the receiver 108 may be separated by a distance 112. The transmitter 104 may include a power transmitting element circuit 114 for transmitting/coupling energy to the receiver 108. The receiver 108 may include a power receiving element circuit 118 for receiving or capturing/coupling energy transmitted from the transmitter 104.

In one illustrative embodiment, the transmitter 104 and the receiver 108 may be configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over larger distances. Resonant inductive coupling techniques may thus allow for improved efficiency and power transfer over various distances and with a variety of inductive power transmitting and receiving element configurations.

In certain embodiments, the wireless field 105 may correspond to the "near field" of the transmitter 104 as will be further described below. The near-field may correspond to a region in which there are strong reactive fields resulting from the currents and charges in the power transmitting element 114 that minimally radiate power away from the power transmitting element 114. The near-field may correspond to a region that is within about one wavelength (or a fraction thereof) of the power transmitting element 114.

In certain embodiments, efficient energy transfer may occur by coupling a large portion of the energy in the wireless field 105 to the power receiving element 118 rather than propagating most of the energy in an electromagnetic wave to the far field.

In certain implementations, the transmitter 104 may output a time varying magnetic (or electromagnetic) field with a frequency corresponding to the resonant frequency of the power transmitting element 114. When the receiver 108 is within the wireless field 105, the time varying magnetic (or electromagnetic) field may induce a current in the power receiving element 118. As described above, if the power receiving element 118 is configured as a resonant circuit to resonate at the frequency of the power transmitting element 114, energy may be efficiently transferred. An alternating current (AC) signal induced in the power receiving element 118 may be rectified to produce a direct current (DC) signal that may be provided to charge or to power a load.

Aspects described herein relate to wireless power transfer systems. In some embodiments, multiple wireless power receivers (e.g., receivers 108) may be receiving wireless power from wireless power transmitter (e.g., transmitter 104) at a first frequency. In some aspects, the receivers 108 may have different sizes and/or different ideal voltages at which to receive power. In such aspects, the transmitter 104 may not be able to supply power at a voltage level that efficiently transfers power to each receiver 108. Embodiments described herein relate to the transmitter 104 using of more than one power transfer frequency to accommodate multiple receivers 108 requirements or desired charging parameters. Additionally, the use of multiple power transfer frequencies may be used to detect unintended devices that may be damaged in the presence of the wireless power transfer field.

Figure 2:
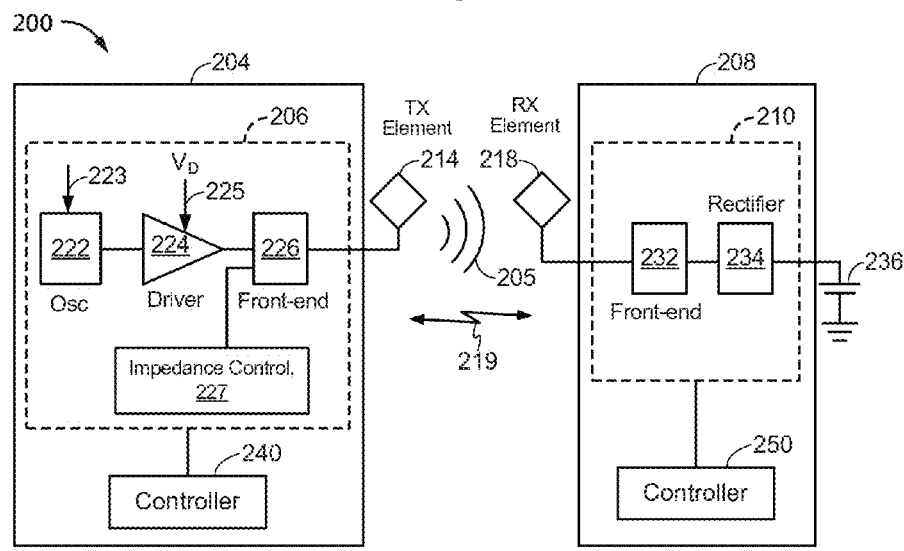
FIG. 2 is a functional block diagram of exemplary components that may be used in the wireless power transfer system of FIG. 1, in accordance with various exemplary embodiments of the invention.

FIG. 2 is a functional block diagram of a wireless power transfer system 200, in accordance with another illustrative embodiment. The system 200 may be a wireless power transfer system of similar operation and functionality as the system 100 of FIG. 1. However, the system 200 provides additional details regarding the components of the wireless power transfer system 200 than FIG. 1. The system 200 may include a transmitter circuit 204 and a receiver circuit 208. The transmitter 204 (also referred to herein as power transmitting unit, PTU) may include transmit circuitry 206 that may include an oscillator circuit 222, a driver circuit 224, a front-end circuit 226, and an impedance control module circuit 227. The oscillator 222 may be configured to generate a signal at a desired frequency that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal (VD) 225. The driver circuit 224 may be a switching amplifier configured to receive a square wave from the oscillator 222 and output a sine wave.

The front-end circuit 226 may include a filter circuit to filter out harmonics or other unwanted frequencies. The front-end circuit 226 may include a matching circuit to match the impedance of the transmitter 204 to the power transmitting element 214. As will be explained in more detail below, the front-end circuit 226 may include a tuning circuit to create a resonant circuit with the power transmitting element 214. As a result of driving the power transmitting element 214, the power transmitting element 214 may generate a wireless field 205 to wirelessly output power at a level sufficient for charging a battery 236, or otherwise powering a load. The impedance control module circuit 227 may control the front-end circuit 226.

The transmitter 204 may further include a controller circuit 240 operably coupled to the transmit circuitry 206 configured to control one or aspects of the transmit circuitry 206 or accomplish other operations relevant to managing the transfer of power. The controller 240 may be a microcontroller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations performed by it. The transmitter 204 may further include a memory (not shown) configured to store data, for example, such as instructions for causing the controller 240 to perform particular functions, such as those related to management of wireless power transfer.

The receiver 208 (also referred to herein as power receiving unit, PRU) may include receive circuitry 210 that may include a front-end circuit 232 and a rectifier circuit 234. The front-end circuit 232 may include matching circuitry to match the impedance of the receive circuitry 210 to the power receiving element 218. As will be explained below, the front-end circuit 232 may further include a tuning circuit to create a resonant circuit with the power receiving element 218. The rectifier circuit 234 may generate a DC power output from an AC power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. Transmitter 204 may be configured to generate a predominantly non-radiative field with a direct field coupling coefficient (k) for providing energy transfer. Receiver 208 may directly couple to the wireless field 205 and may generate an output power for storing or consumption by a battery (or load) 236 coupled to the output or receive circuitry 210.

The receiver 208 may further include a controller circuit 250 configured similarly to the transmit controller 240 as described above for managing one or more aspects of the wireless power receiver. The receiver 208 may further include a memory (not shown) configured to store data, for example, such as instructions for causing the controller 250 to perform particular functions, such as those related to management of wireless power transfer.

As discussed above, transmitter 204 and receiver 208 may be separated by a distance and may be configured according to a mutual resonant relationship to minimize transmission losses between the transmitter and the receiver. In some aspects, the wireless power transfer system 200 represents a more detailed view of the wireless power transfer system 100.

Figure 3:
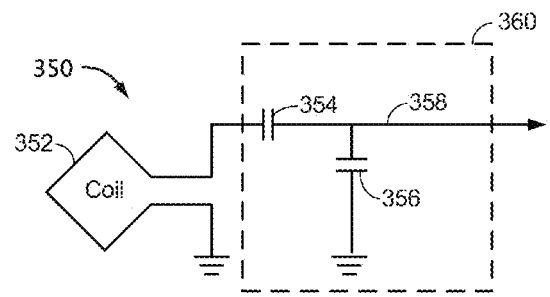
FIG. 3 is a schematic diagram of a portion of transmit circuitry or receive circuitry of FIG. 2, in accordance with exemplary embodiments of the invention.

FIG. 3 is a schematic diagram of a portion of the transmit circuitry 206 or the receive circuitry 210 of FIG. 2, in accordance with illustrative embodiments. As illustrated in FIG. 3, transmit or receive circuitry 350 may include a power transmitting or receiving element circuit 352 and a tuning circuit 360. The power transmitting or receiving element 352 may also be referred to or be configured as an antenna or a "loop" antenna. The term "antenna" generally refers to a component that may wirelessly output or receive energy for coupling to another "antenna." The power transmitting or receiving element 352 may also be referred to herein or be configured as a "magnetic" antenna, or an induction coil, a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown in this figure).

When the power transmitting or receiving element 352 is configured as a resonant circuit or resonator with tuning circuit 360, the resonant frequency of the power transmitting or receiving element 352 may be based on the inductance and capacitance. Inductance may be simply the inductance created by a coil or other inductor forming the power transmitting or receiving element 352. Capacitance (e.g., a capacitor) may be provided by the tuning circuit 360 to create a resonant structure at a desired resonant frequency.

As a non-limiting example, the tuning circuit 360 may comprise a capacitor 354 and a capacitor 356 may be added to the transmit and/or receive circuitry 350 to create a resonant circuit.

The tuning circuit 360 may include other components to form a resonant circuit with the power transmitting or receiving element 352. As another non-limiting example, the tuning circuit 360 may include a capacitor (not shown) placed in parallel between the two terminals of the circuitry 350. Still other designs are possible. In some embodiments, the tuning circuit in the front-end circuit 226 may have the same design (e.g., 360) as the tuning circuit in front-end circuit 232. In other embodiments, the front-end circuit 226 may use a tuning circuit design different than in the front-end circuit 232.

For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352. Embodiments and descriptions provided herein may be applied to resonant and non-resonant implementations (e.g., resonant and non-resonant circuits for power transmitting or receiving elements and resonant and non-resonant systems). In some aspects, the transmit or receive circuitry 350 may facilitate wireless power reception or transmission at a frequency that is more efficient than wireless power reception or transmission using transmit or receive circuitry without the tuning circuit 360.

Figure 4:
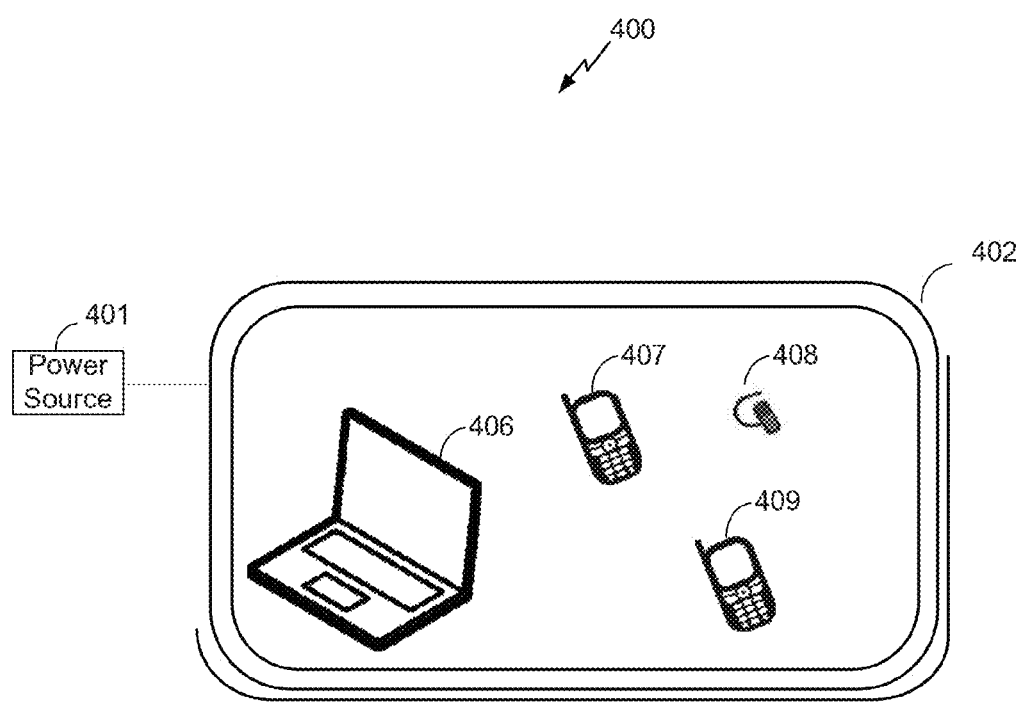
FIG. 4 is a diagram of an exemplary wireless power transfer system, in accordance with exemplary embodiments of the invention.

FIG. 4 is a diagram of another exemplary wireless power transfer system 400, in accordance with another illustrative embodiment. The wireless power transfer system 400 comprises a power transmitting unit (PTU) 402 coupled to a power source 401 and power receiving units (PRUs) 406, 407, 408, and 409. In some aspects, the power source 401 may comprise a universal series bus (USB) power source, a wall outlet, a battery, solar power, or other power source. The PTU 402 may be similar to and may comprise similar components as the transmitter 104 and/or 204 of FIGS. 1 and 2. For example, PTU 402 may comprise one or more of the power transmitting elements 114, 214, and 352 of FIGS. 1-3 and the transmit circuitry 206 of FIG. 2. Additionally, the PRUs 406, 407, 408, and 409 may be similar to and may comprise similar components as the receiver 108 and/or 208 of FIGS. 1 and 2. For example, PRUs 406, 407, 408, and 409 may comprise one or more of the power receiving elements 118, 218, and 352 of FIGS. 1-3 and the receive circuitry 210 of FIG. 2.

As shown, the PRUs 406, 407, 408, and 409 may be placed on a surface of or close to the PTU 402 for charging. While PRUs 406, 407, 408, and 409 are shown, in some aspects, the wireless power transfer system 400 may comprise a single or dedicated PTU 402 and a single or dedicated PRU (e.g., PRU 406). In other embodiments, more than or less than three PRUs may be placed on the surface of or close to the PTU 402 for charging the PRUs.

In some embodiments, PRUs 406, 407, 408, and 409 may more efficiently receive power from the PTU 402 at different voltage levels based on a size of the PRUs 406, 407, 408, and 409. For example, larger receive devices may pick up more H-field because their larger area coils, resulting in higher voltages at the rectifier (e.g., rectifier 234). For the larger PRUs (e.g., PRU 406 as shown in FIG. 4), the PRU 406 may more easily handle or receive high voltages than very low voltages. Additionally, larger PRUs (e.g., laptops, etc.) may take more power than smaller PRUs (e.g., phones, ear pieces). At those powers, a lower frequency can transfer power more efficiently due to lower wire, diode and amplifier AC losses. In addition, larger PRUs may "average out" the H-field from the PTU 402, reducing the voltage range the PRU is designed to operate over, which may simplify design.

In an example of smaller PRUs (e.g., PRU 408, Bluetooth headphones, hearing aids, etc.), effective voltages may be very low which may impact the ability to operate. Smaller PRUs may have difficulty having enough voltage to cause forward conduction of diodes, since voltage induced is proportional to area of the coil. A higher frequency can increase voltage received by the small device since voltage is linearly proportional to frequency.

In some embodiments, it may be difficult for the PTU 402 to find a single magnetic field intensity that makes two devices simultaneously "happy"—e.g., get the voltage to the ideal voltage for both PRUs (e.g., PRU 406 and 408). In some aspects, a compromise voltage is chosen, and often this results in both PRUs 406 and 408 being less efficient. Accordingly, it may be beneficial to the PTU 402 to be able to control the amount of power delivered to multiple devices placed on or close to the PTU 402 to more efficiently deliver power to PRUs of different sizes and different ideal voltages for wireless power transfer. In some embodiments, the PTU 402 may utilize more than one wireless power transfer frequency to accommodate multiple devices, both intended (e.g., PRUs 406, 407, and 408) and unintended (e.g., RFID cards discussed below). Specifically, harmonics of a fundamental frequency may be mixed into the transmitted signal to achieve what are effectively separate "bands" that receivers can use independently.

Additionally, RFID cards (especially those that operate at 13.56 MHz) can sometimes be damaged by a strong magnetic field generated by the PTU 402 (e.g., a magnetic field at a level sufficient for powering a device such as PRUs 406-409). Accordingly, it may be beneficial to the PTU 402 to be able to detect whether a RFID card is in the vicinity of the PTU 402 while the PTU 402 is providing a strong magnetic field capable of damaging the RFID card. For example, the PTU 402 can send a strong signal at the RFID's operating frequency (e.g., 13.56 MHz) and read the RFID card when it is still fairly far away—at a distance where damage is unlikely. In some aspects, the PTU 402 may adjust or shut off power transfer based on detecting a RFID card and may beneficially avoid damaging the RFID card and/or the PTU 402. For example, if the PTU 402 operates at 6.78 MHz, and uses 13.56 MHz and 27.12 MHz harmonics to support smaller PRUs, it can ensure that the 13.56 MHz field remains stronger than the other two by reducing the other two frequencies to a power that is lower than the 13.56 MHz, but still sufficient to power the 6.78 and 27.12 MHz devices. Then the PTU 402 modulates the 13.56 MHz signal with an ASK signal to generate an RFID communication request—and if the PTU 402 detects an answering load modulation signal, then the PTU 402 may shut down. In some embodiments, a large enough 13.56 MHz signal should allow communication even in the presence of a reduced strength 6.78 MHz power signal.

Figure 5:
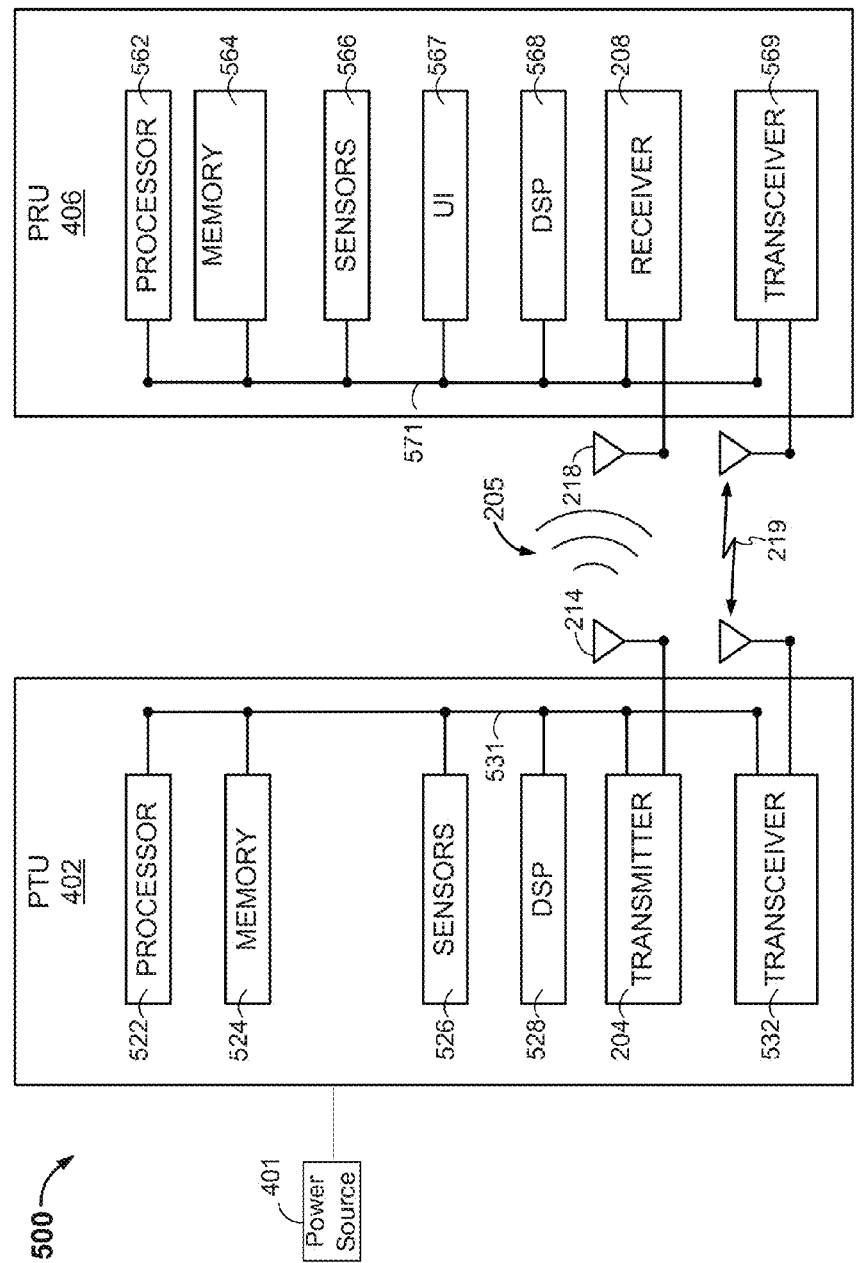
FIG. 5 is a functional block diagram of a wireless power transfer system, in accordance with exemplary embodiments of the invention.

FIG. 5 shows an exemplary functional block diagram of a wireless power transfer system 500. In some aspects, the PTU 402, via the power transmitting element 214, may transfer wireless power to the power receiving element 218 of the PRU 406. As shown, the PTU 402 is coupled to the power source 401 and may utilize the processes and methods disclosed herein. In some aspects, the PTU 402 is an example of a device that may be configured to transmit wireless power using the power transmitting element 214 and via the magnetic field 205 in accordance with the descriptions of FIGS. 1-4, (above).

The PTU 402 may comprise a processor circuit 522 configured to control the operation of the PTU 402. The processor 522 may also be referred to as a central processing unit (CPU). The processor 522 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include physical machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The PTU 402 may further comprise a memory circuit 524, which may include both read-only memory (ROM) and random access memory (RAM), may provide instructions and data to the processor 522. The memory 524 may be operably coupled to the processor 522. A portion of the memory 524 may also include non-volatile random access memory (NVRAM). The processor 522 typically performs logical and arithmetic operations based on program instructions stored within the memory 524. The instructions in the memory 524 may be executable to implement the methods described herein.

The PTU 402 may further comprise one or more sensor circuits 526 operably coupled to the processor 522 and/or the memory 524 via a bus 531. The bus 531 may include a data bus, for example, as well as a power bus, a control signal bus, and a status signal bus. Those of skill in the art will appreciate that the components of the PTU 402 may be coupled together or accept or provide inputs to each other using some other mechanism.

The sensors 526 may include, but are not limited to power sensors, temperature sensors, impedance sensors, or other types of sensors. The sensors 526 may be configured to sense or detect the placement of one or more PRUs (e.g., PRUs 406-409) on or close to the surface of the PTU 402. The processor 522 may identify certain capabilities of the PRUs 406-408 based on the placement. In some aspects, the processor 522 may receive an indication of the PRUs 406-409 capabilities from the sensors 526 or a transceiver 532 (discussed below).

The PTU 402 may also include a digital signal processor (DSP) circuit 528 for use in processing signals. The DSP 528 may be configured to generate a packet for transmission.

The PTU 402 may also comprise the transmitter 204 and the power transmitting element 214 of FIG. 2 for transmission of wireless power via the wireless field 205, for reception by the PRU 406 at the power receiving element 218 (FIG. 2).

The PTU 402 may also comprise a transceiver circuit 532 allowing transmission and reception of data between the PTU 402 and the PRU 406 via the communication channel 219. In some aspects, the transceiver 532 may comprise any communication unit or communication means. Such data and communications may be received by a transceiver circuit 569 within the PRU 406. The transceiver 569 may transmit power demand requests or signals for configuring or modifying the transmit power level of the wireless field 205. In some aspects, the power demand requests may include preferred charging parameters for the PRU 406. For example, the PRU 406 may be placed close to or on the surface of the PTU 402 and the transceiver 569 may transmit a power demand request indicating a preferred transmit frequency of 6.78 MHz.

In some embodiments, the transceiver 532 may receive the power demand request and communicate the power demand request to the processor 522 via the bus 531. The processor 522 may then determine whether the transmitter 204 is capable of supplying power at the frequency indicated in the power demand request (e.g., 6.78 MHz). In some aspects, the processor 522 may store in the memory 524 a table or database of frequencies that the transmitter 204 is capable of providing. In one example, the table may indicate that the transmitter 204 is capable of providing 3 different frequencies. In some embodiments, it may be beneficial that the three frequencies comprise a fundamental frequency (e.g., 6.78 MHz) and two harmonics of the fundamental frequency (e.g., 13.56 and 27.12 MHz). For example, the use of harmonic frequencies may allow for less complex circuitry for generating and filtering the harmonic frequencies. In other embodiments, the transmitter 204 may be capable of providing power over different non-harmonic frequencies. For example, in some aspects, the transmitter 204 may provide power at widely separated frequencies (e.g., 6.78 MHz and at 200 kHz) to help avoid interference between the frequencies.

In response to detecting the placement of the PRU 406 or to receiving a power demand request from the transceiver 532, the processor 522 may determine whether there a free entry in the table that matches the PRU 406's capabilities. For example, the processor 522 may determine that the PRU 406 is capable of receiving power at 6.78 MHz and 13.56 MHz and that the PRU 406 prefers 6.78 MHz. If no other device is requesting power at 6.78 MHz, the processor 522 may assign the PRU 406 to the 6.78 MHz frequency in the table. In another example, if another device is already assigned to the 6.78 MHz frequency, that device is not capable of receiving other frequencies, and/or that device has a higher priority than the PRU 406, then the processor 522 may assign the PRU 406 to the 13.56 MHz frequency.

In some embodiments, the processor 522 may also determine whether the PTU 402 should check if any RFID cards are in the vicinity. If so, the processor 522 may assign the frequency 13.56 MHz to RFID detection. As explained above, the processor 522 may instruct the transmitter 204 to transmit a modulated signal at the RFID's operating frequency (e.g., 13.56 MHz) in order to read the RFID card when it is still fairly far away—at a distance where damage is unlikely. For example, if the transmitter 204 operates at 6.78 MHz, and uses 13.56 MHz and 27.12 MHz harmonics to support smaller PRUs, it can generate a 13.56 MHz field stronger than the other two by reducing the other two frequencies to a power that is lower than the 13.56 MHz frequency power, but still sufficient to power the 6.78 and 27.12 MHz devices. In order to read the RFID card, the transmitter 204 may modulate the 13.56 MHz signal with an ASK or other signal to generate a REQA request or other requests to elicit a response from the RFID card. If the transceiver 532, sensors 526, or transmitter 204 detects an answering load modulation signal from the RFID card, then the processor 522 may adjust or shut off power transfer based on detecting the RFID card and may beneficially avoid damaging the RFID card and/or the PTU 402.

The PRU 406 may comprise a processor 562, one or more sensors 566, a DSP 568 and the transceiver 569 similar to the corresponding components of the PTU 402. The PRU 406 may further comprise a memory 564 similar to the memory 524, described above. Similar to the memory 524, the memory 564 may comprise both read-only memory (ROM) and random access memory (RAM), may provide instructions and data to the processor 562. A portion of the memory 564 may also include non-volatile random access memory (NVRAM).

The PRU 406 may also comprise the receiver 208 of FIG. 2 for receiving wireless power via the wireless field 205 from the transmitter 204 using the power receiving element 218. As described herein, the receiver 208 may be configured to receive power at a particular frequency (e.g., the fundamental or one of the harmonics generated by the transmitter as described above). The receiver 208 may be tuned or be configured to tune itself to receive power at a particular frequency (e.g., may be capable of different modes or tuning configurations associated with a particular frequency). The receiver 208 may be operably connected to the processor 562, the memory 564, the sensor 566, UI 567 and DSP 568 via a bus 571, similar to the bus 531. Those of skill in the art will appreciate that the components of the PRU 406 may be coupled together or accept or provide inputs to each other using some other mechanism.

In some embodiments, the transceiver 569 may communicate the PRU 406 capabilities to the transceiver 532. The PRU 406 capabilities may include a list of frequencies over which it may receive power, a preferred frequency, a maximum voltage, a maximum current, a preferred voltage, a preferred current, minimum current, minimum voltage, etc. In some aspects, the PTU 402 may have the PRU 406 capabilities stored in the memory 524.

In embodiments where two or more chargeable devices are placed on or close to the surface of the PTU 402, the processor 522 may assign the PRU 406 a frequency for power transfer based on the PRU 406 capabilities. For example and with reference to FIG. 4, the PRUs 406-409 may be placed on the surface of the PTU 402. The processor 522 may determine (e.g., receive a list of capabilities from PRUs 406-409) that the PRU 406 is capable of receiving power over the frequencies 6.78 MHz and 13.56 MHz, the PRU 407 is capable of receiving power over the frequencies 13.56 MHz and 27.12 MHz, the PRU 408 is capable of receiving power over the frequency 27.12 MHz, and the PRU 409 is capable of receiving power over the frequencies 13.56 MHz or 27.12 MHz. Accordingly, the processor 522 may assign the 6.78 MHz frequency to PRU 406, the 13.56 MHz frequency to PRU 407, and the 27.12 MHz frequency to PRU 408 based on each of the PRUs 406-409 capabilities. This assignment beneficially allows each device to receive power over its own individualized frequency within its respective capabilities.

In other embodiments, the transmitter 204 may be configured to generate magnetic fields at two or more frequencies without receiving a list of capabilities from the PRUs 406-408 and assigning frequencies to the PRUs 406-409. For example, the transmitter may provide power at the frequencies 6.78 MHz, 13.56 MHz, and 27.12 MHz, and the PRUs 406-409 may be designed to receive power over one or more of those frequencies and determine over which frequency to receive power without prior negotiation with the PTU 402.

In some aspects, the power receiving element 218 may be configured to receive more than one frequency (e.g., harmonics). Additionally, power receiving element 218 may comprise a wideband receiver configured to receive all frequencies equally. Such a power receiving element 218 may provide flexibility for receiving different frequencies. In some aspects, resonant tuning may be desirable to reduce the source impedance of the power receiving element 218 enough to receive significant amounts of power. In some embodiments, it may be advantageous to allow the PRU 406 to choose a frequency to operate on. This can be accomplished by changing a tuning capacitor of the power receiving element 218 to resonate at a new frequency. This may allow the processor 562 to choose the frequency best suited for current charging conditions.

In some embodiments, the transceiver 532 and the transmitter 204 may share the power transmitting element 214. For example, in an aspect of an embodiment, the transceiver 532 may be configured to send data via modulation of the wireless field 205 used for transferring power. In another example the communication channel 219 is different than the wireless field 205, as shown in FIG. 5. In another example, the transceiver 532 and the transmitter 204 may not share the power transmitting element 214 and may each have their own antennas. Likewise, the transceiver 569 and the receiver 208 may share the power receiving element 218 and the transceiver 569 may be configured to receive data via modulation of the wireless field 205 used for transferring power. In other embodiments, the transceiver 569 and the receiver 208 may not share the power receiving element 218 and may each have their own antennas and the communication channel 219 is different than the wireless field 205.

The PRU 406 may further comprise a user interface (UI) 567 in some aspects. The user interface 567 may comprise a keypad, a microphone, a speaker, and/or a display. The user interface 567 may include any element or component that conveys information to a user of the PRU 406 and/or receives input from the user.

Although a number of separate components are illustrated in FIG. 5, those of skill in the art will recognize that one or more of the components may be combined or commonly implemented. For example, the processor 522 may be used to implement not only the functionality described above with respect to the processor 522, but also to implement the functionality described above with respect to the sensors 526 and/or the DSP 528. Likewise, the processor 562 may be used to implement not only the functionality described above with respect to the processor 562, but also to implement the functionality described above with respect to the sensor 566 and/or the DSP 568. Further, each of the components illustrated in FIG. 5 may be implemented using a plurality of separate elements.

Such implementations of wireless power transfer system 500 described above may be beneficial because they may allow the PTU 402 to transfer power to multiple devices having different sizes and power receiving capabilities. Accordingly, the wireless power transfer systems 100, 200, 400, and 500 may more efficiently transfer power and may reduce the instances of the PTU 402 damaging RFID cards or devices within or in the vicinity of the PTU 402 charging region.

Figure 6:
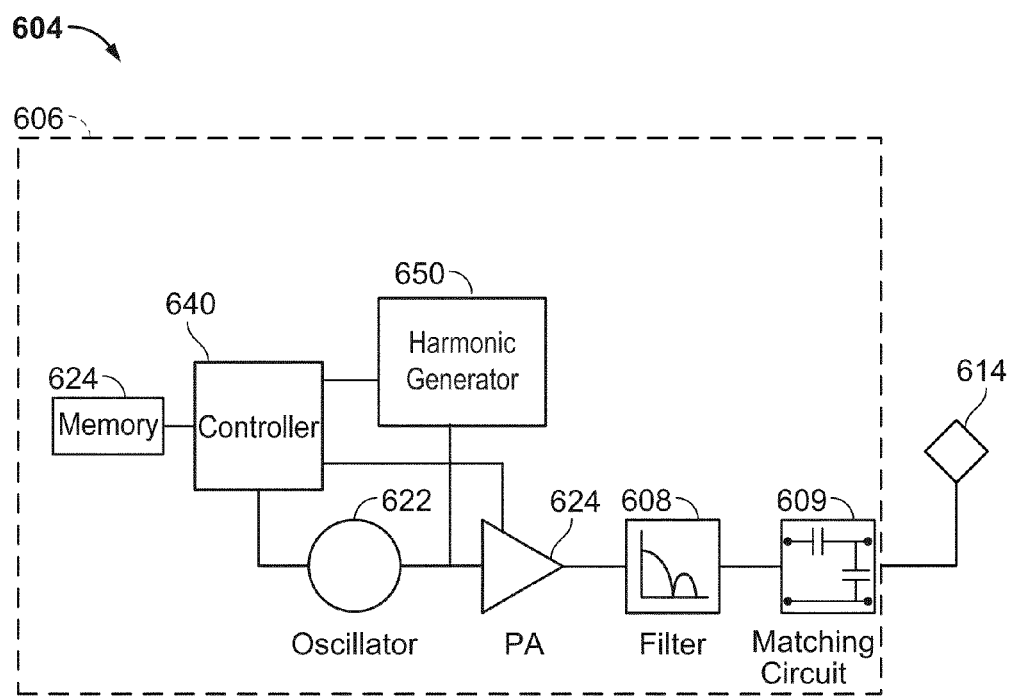
FIG. 6 is a schematic diagram of a transmitter, in accordance with exemplary embodiments of the invention.

FIG. 6 is a functional block diagram of a transmitter 604 that may be used in the wireless power transfer system of FIG. 5, in accordance with exemplary embodiments of the invention. The transmitter 604 may be a wireless power transmitter of similar operation and functionality as the wireless power transmitter 204 of FIGS. 2 and 5. However, the transmitter 604 provides additional details regarding the components of the transmitter 604 than FIGS. 2 and 5. The transmitter 604 may include transmit circuitry 606 and a power transmitting element circuit 614. The power transmitting element 614 may be the power transmitting element 352 as shown in FIG. 3. The power transmitting element 614 may be configured as the power transmitting element 214 as described above in reference to FIG. 2. In some implementations, the power transmitting element 614 may be a coil (e.g., an induction coil). In some implementations, the power transmitting element 614 may be associated with a larger structure, such as a pad, table, mat, lamp, or other stationary configuration. Transmit circuitry 606 may provide power to the power transmitting element 614 by providing an oscillating signal resulting in generation of energy (e.g., magnetic flux) via the power transmitting element 614.

Transmit circuitry 606 may include a fixed impedance matching circuit 609 for matching the impedance of the transmit circuitry 606 (e.g., 50 ohms) to the impedance of the power transmitting element 614 and a low pass filter (LPF) circuit 608 configured to reduce unintended harmonic emissions to levels to prevent interference with devices and self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the power transmitting element 614 or DC current drawn by a driver circuit. Transmit circuitry 606 further includes an oscillator circuit 622 configured to provide an oscillator signal at a desired frequency that may be adjusted in response to a signal from a controller circuit 640. The oscillator 622 and the controller 640 may be configured as the oscillator 222 and controller 240, respectively, as described above in reference to FIG. 2. The oscillator 622 may provide the oscillator signal to a power amplifier (PA) 624. The PA 624 may be configured to drive the power transmitting element 614 at, for example, one or more resonant frequencies of the power transmitting element 614 based on the number PRUs placed on the surface of transmitter 604. The transmit circuitry 606 may be comprised of discrete devices or circuits, or alternately, may be comprised of an integrated assembly.

The controller 640 may also be configured to selectively enable the oscillator 622 during transmit phases (or duty cycles) for specific PRUs, for adjusting the frequency or phase of the oscillator 622, and for adjusting the output power level for implementing a communication protocol for interacting with neighboring devices through their attached receivers. It is noted that the controller 640 may also be referred to herein as a processor. The transmit circuitry 606 may further include a harmonic generator circuit 650 operationally coupled to the controller 640. The harmonic generator 650 may be configured to generate or otherwise provide harmonics of a first or fundamental frequency to be output by the oscillator 622/PA 624 (e.g., alter the output of the oscillator 622 or PA 624 to cause the signal driving the power transmit element 614 to include content at the first or fundamental frequency or harmonics). In some aspects, the harmonic generator 650 may provide the generated harmonics to the PA 624. For example, the oscillator 622 may generate 6.78 MHz signal and the harmonic generator 650 may generate 13.56 MHz and 27.12 MHz signals. These three signals may be summed and used by the PA 624 to drive the power transmitting element 614 to generate the summed waveform. Such an embodiment may have the benefit of requiring less circuitry.

In some aspects, the transmit circuitry 606 may comprise more than one PA 624 and power transmitting element 614 in order to provide the three signals at the three frequencies. For example, the transmitter 604 may comprise three separate but co-located power transmitting elements 614, each one driven by its own PA 624. For example, transmitter 604 may comprise multiple separate by co-located coils (e.g., three induction coils) driven by the PA 624 to provide the three signals at the three frequencies. Such an embodiment may have the benefit that each power transmitting element 614 can be resonant at the respective PA 624 frequency.

In other embodiments, the harmonic generator 650 may introduce distortion to the signal generated by the oscillator 622 in order to provide the three signals at the three frequencies. For example, the harmonic generator 650 may introduce distortion (for example, altering or clipping the waveform) to produce strong harmonics, and the harmonic generator 650 and/or controller 640 may vary the amount of distortion to control the level of harmonics. This method may require additional filtering (e.g., one or more LPF 608) to filter out the undesirable harmonics. Such an embodiment may have the benefit of reduced cost and complexity of the transmit circuitry 606.

As described above in connection with FIG. 4, it may be beneficial for the transmitter 604 to be able to transfer power to multiple PRUs (e.g., PRUs 406-409) placed on or close to the surface of PTU 402 over multiple frequencies to more efficiently deliver power to PRUs of different sizes and having different ideal voltages for wireless power transfer.

Figure 7:
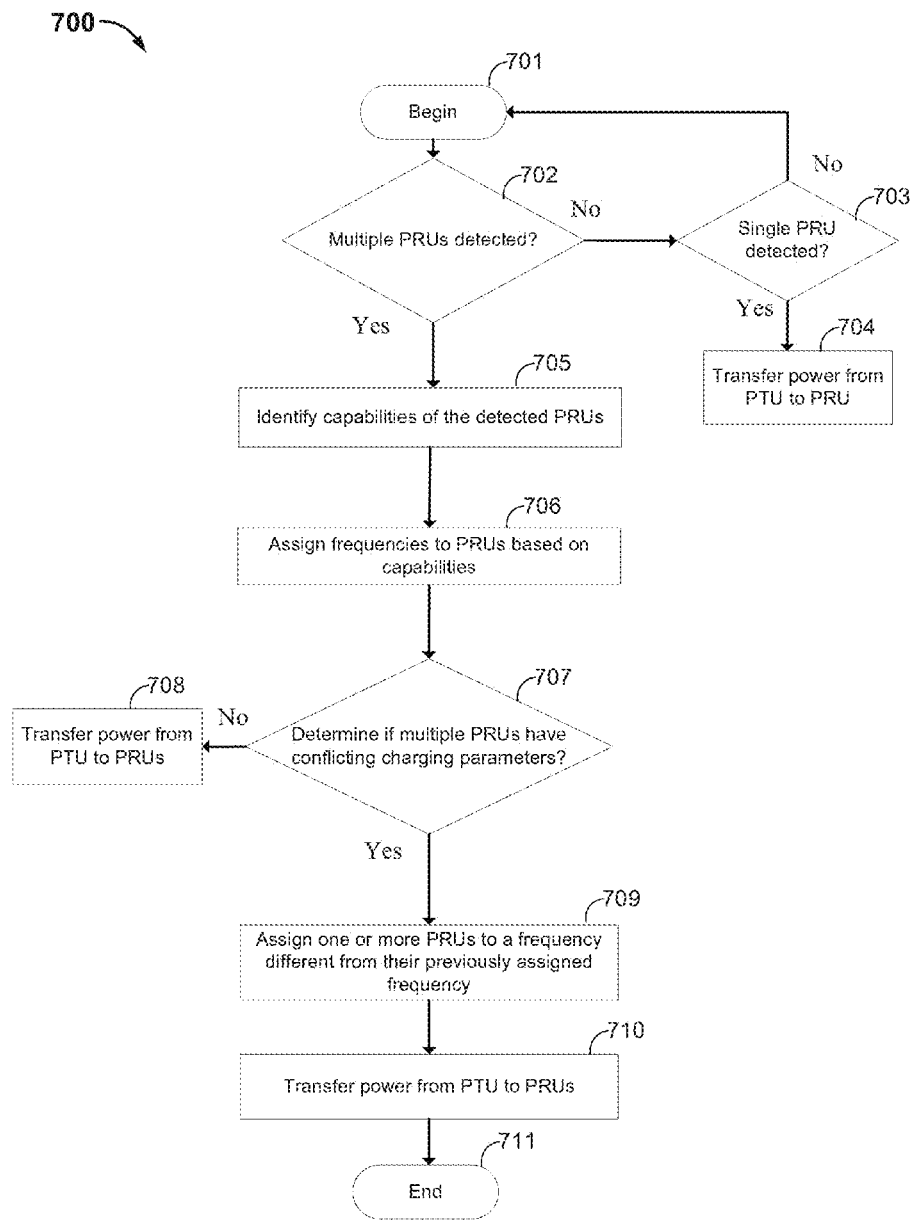
FIG. 7 is a flowchart of an exemplary method of coordinating wireless power transfer, in accordance with exemplary embodiments of the invention.

FIG. 7 is a flowchart of an exemplary process 700 of transmitting wireless power, in accordance with one embodiment. The method shown in FIG. 7 may be implemented via one or more devices including transmitter 104, the receiver 108, the power transmitting element 114, the power receiving element 118, the power transmitting element 214, the power receiving element 218, the transmit or receive circuitry 350, the PTU 402, and the transmitter 604 of FIGS. 1-6. Although the process 700 is described herein with reference to a particular order, in various implementations, blocks herein may be performed in a different order, or omitted, and additional blocks may be added.

At block 701, the method begins when the one or more PRUs (e.g., PRUs 406-408) are placed close to or on the surface of the PTU 402. At block 702, the processor 522 determines whether multiple PRUs are detected in the charging region of the PTU 402. In some embodiments one or more of the sensors 526, transmitter 204, or transceiver 532 may detect the PRUs. If the processor 522 determines that there are not multiple PRUs detected, then at block 703, the processor 522 determines whether there is a single PRU detected in the charging region. If yes, then at block 704, the PTU 402 provides power to the single PRU (e.g., PRU 406). In some aspects, if the single PRU is configured for receiving power at a particular frequency that is a harmonic of a fundamental frequency used by the PTU 402, at block 704, the PTU 402 may transmit power having levels of harmonics corresponding to the particular harmonic frequency for powering or charging the single PRU. If no, then the processor 522 determines that there are no PRUs in the charging region and the method returns to block 701.

Returning to block 702, if the processor 522 determines that multiple PRUs are detected in the charging region, then at block 705, the processor 522 then identifies the capabilities of the detected PRUs. As discussed with reference to FIGS. 4 and 5, the PRUs 406-408 may communicate their respective capabilities to the PTU 402 via their respective transceivers 569 (e.g., over communication channel 219) or power receiving elements 218 (e.g., via in-band signaling using characteristics of the wireless field 205). The PTU 402 may also identify the respective capabilities of the PRUs 406-408 by accessing their respective capabilities stored in the memory 524. In some aspects, the PRUs 406-408 capabilities may include a list of frequencies over which the PRU may receive power, a preferred frequency, a maximum voltage, a maximum current, a preferred voltage, a preferred current, minimum current, minimum voltage, etc.

At block 706, the processor 522 assigns a frequency to each of the detected PRUs based on the PRU capabilities. For example, the processor 522 may assign frequencies in a table stored in the memory 524. Below is an example of a table, Table 1, that may be used to assign frequencies to one or more PRUs. In some embodiments, block 706 may be omitted. For example, in some aspects, the PTU 402 or transmitter 204 may be capable of providing power at two or more frequencies and the processor 522 may obtain the PRU capabilities from the memory 524. In such embodiments, the processor 522 may determine it is capable of providing power at a frequency based on the PRU capabilities. Accordingly, the transmitter 204 may provide power at a frequency of the two or more frequencies rather than assign the PRU to a specific frequency. In some embodiments the two or more frequencies may be an integer multiple of one or more of the two or more frequencies. For example, a first frequency may be frequency based on Table 1 and a second frequency may be an integer multiple (e.g., 1, 2, 3, 4, etc.) of the first frequency. In some embodiments, the transmitter 204 may concurrently provide power to a two or more PRUs at the two or more frequencies based on the respective frequency charging capability of the two or more PRUs.

TABLE 1

| Frequency | Assignment |
| --- | --- |
| 6.78 MHz | |
| 13.56 MHz | |
| 27.12 MHz | |

As PRUs 406-408 are placed close to or on the surface of the PTU 402, the processor 522 may assign the PRUs 406-408 to a frequency based on their determined capabilities. For example, the PTU 402 may determine that PRU 406 is capable of receiving power at 6.78 MHz and 13.56 MHz and that the PRU 406 prefers 6.78 MHz. If no other device is requesting power at 6.78 MHz, the processor 522 may assign the PRU 406 to the 6.78 MHz frequency in the table. The PTU 402 may also determine that the PRU 407 is capable of receiving power over the frequencies 13.56 MHz and 27.12 MHz, and the PRU 408 is capable of receiving power over the frequency 27.12 MHz. Accordingly, the processor 522 may assign the PRU 407 to the 13.56 MHz and the PRU 408 to the 27.12 MHz frequency as shown below in Table 2.

TABLE 2

| Frequency | Assignment |
| --- | --- |
| 6.78 MHz | PRU 406 |
| 13.56 MHz | PRU 407 |
| 27.12 MHz | PRU 408 |

At block 707, the processor 522 may determine if multiple PRUs have conflicting charging parameters. In some embodiments, the conflicting charging parameters comprise conflicting frequencies, voltage levels, current levels, or other charging parameters. For example, the processor 522 may determine if multiple devices are assigned to the same frequency. Additionally, the processor 522 may determine whether PRUs assigned to the same frequency have different voltage requirements or preferred voltage levels. If there are no conflicting charging parameters (e.g., as shown in the Table 2), then at block 708, the transmitter 204 may provide power from the PTU 402 to the PRUs 406-408. In some embodiments, the transmitter 204 may concurrently or approximately at the same time provide power from the PTU 204 to the PRUs 406-408. For example, the transmitter 204 may provide power to PRU 406 at a first frequency (e.g., 6.78 MHz), provide power to PRU 407 at a second frequency that is an integer multiple of the first frequency (e.g., 13.56 MHz), and provide power to PRU 408 at a third frequency that is an integer multiple of either the first or second frequencies (e.g., 27.12 MHz).

If the processor 522 determines that multiple PRUs have conflicting charging parameters, then at block 709, the processor 522 may assign one or more PRUs to a frequency different from their previously assigned frequency. For example, in addition to the PRUs 406-408, a PRU 409 may be placed close to or on the surface of the PTU 402. Based on the capabilities of the PRU 409 (e.g., only can receive power over 13.56 MHz), the processor 522 may have assigned frequencies as shown in Table 3 below.

TABLE 3

| Frequency | Assignment | Notes |
| --- | --- | --- |
| 6.78 MHz | PRU 406 | |
| 13.56 MHz | PRU 407, PRU 409 | PRU 407 voltage too low, PRU 409 voltage too high |
| 27.12 MHz | PRU 408 | |

As noted in Table 3, while both PRU 407 and PRU 409 are capable of receiving power over the 13.56 MHz frequency, the voltage level received by the PRU 407 may be too low as compared to its desired voltage level and the voltage level received by the PRU 409 may be too high as compared to its desired voltage level. In some embodiments, the processor 522 may then determine to move the PRU 407 to the 27.12 MHz frequency because the PRU 407 is capable of receiving power over this frequency and the PRU 407's desired voltage level more closely matches the PRU 408's desired voltage level. Accordingly, PRU 409 would be assigned the 13.56 MHz frequency and PRUs 407 and 408 would be assigned to the 27.12 MHz frequency as indicated in Table 4.

TABLE 4

| Frequency | Assignment | Notes |
| --- | --- | --- |
| 6.78 MHz | PRU 406 | |
| 13.56 MHz | PRU 409 | |
| 27.12 MHz | PRU 407, PRU 408 | PRU 407 moved to 27.12 MHz |

In another example, in addition to the PRUs 406-409 the PTU 402 may also monitor for RFID devices over the 13.56 MHz frequency. In this embodiment, the PRU 409 may only be capable of receiving power over the 27.12 MHz frequency. The processor 522 may have assigned frequencies as shown in Table 5 below.

TABLE 5

| Frequency | Assignment | Notes |
| --- | --- | --- |
| 6.78 MHz | PRU 406 | |
| 13.56 MHz | RFID, PRU 407 | PRU 407 capable but non-ideal coupling |
| 27.12 MHz | PRU 408, PRU 409 | |

As shown in Table 5, the PRU 407 may be capable of receiving power over the 13.56 MHz frequency but the coupling between the PTU 402 and the PRU 407 at the 13.56 MHz may be low and may result in inefficient power transfer, or may be too high and thus cause the PRU to operate at a voltage that is higher than ideal. In some embodiments, the processor 522 may then determine to move the PRU 407 to the 27.12 MHz frequency because the PRU 407 is capable of receiving power over this frequency and the coupling between the PTU 402 and PRU 407 may be altered. Accordingly, PRUs 407-409 would be assigned the 27.12 MHz frequency and the 13.56 MHz frequency would be assigned solely for RFID detection as shown in Table 6 below. In some aspects, the processor 522 may increase the power provided over the 13.56 MHz frequency to increase the RFID detection range.

TABLE 6

| Frequency | Assignment | Notes |
| --- | --- | --- |
| 6.78 MHz | PRU 406 | |
| 13.56 MHz | RFID | |
| 27.12 MHz | PRU 407, PRU 408, PRU 409 | PRU 407 moved to 27.12 MHz (13.56 MHz energy may now increase) |

After the processor 522 assigns the one or more PRUs a different frequency than previously assigned, then at block 710, the transmitter 204 provides power from the PTU 402 to the PRUs 406-409. In some embodiments, the transmitter 204 may provide power from the PTU 204 to the PRUs 406-409 at approximately the same time or concurrently. For example, the transmitter 204 may provide power to PRU 406 at a first frequency (e.g., 6.78 MHz) and provide power to PRU 407, 408 and/or 409 at a second frequency that is an integer multiple of the first frequency (e.g., 27.12 MHz). At block 711, the method ends. As such in accordance with aspects of embodiments described herein, the PTU 402 may be able to both output a signal with multiple frequency components as well as selecting which frequency has the greatest amplitude (e.g., "strongest") as compared to the others. In some embodiments, the multiple frequencies may be an integer multiple of a first frequency. As described with reference to Tables 5 and 6, the PTU 402 may assign PRUs to different frequencies based on the charging capabilities, power requirements, and/or power requests of the PRUs. The PTU 402 may then dynamically adjust which frequency the transmitter 204 will provide power at the highest or strongest level compared to the other frequencies according to the power requirements/requests from different PRUs that are receiving power at the different frequencies. For example, as described above with respect to Table 6, after the PTU 402 assigns the PRU 407 to the 27.12 MHz frequency, the processor 522 may determine to adjust the power level or amplitude of the 13.56 MHz frequency such that the power level is higher than the 6.78 or 27.12 MHz frequencies.

In some aspects, the transmitter 204 may provide power over one or more frequencies to detect an RFID device being placed on the surface of or close to the PTU 402. RFID devices typically cannot tolerate voltage, current, and/or magnetic field levels that are produced by the transmitter 204 in order to charge or power PRUs 406-408. Thus, it may be beneficial to detect RFID devices before the RFID devices are located close enough to be damaged the PTU 402. When the RFID device is brought near the charging field, the RFID device may detect the power transmitted from the PTU 402 at a distance where the RFID will not be damaged by the PTU 402 and provide a response to the PTU 402. For example, the power provided at one or more frequencies may contain modulation (e.g., an amplitude shift keying (ASK) signal) that queries any nearby RFID cards. The PTU 402 may detect the response from the RFID card. Once the PTU 402 detects the response from the RFID card it can shut down to prevent damage to the RFID card.

Figure 8:
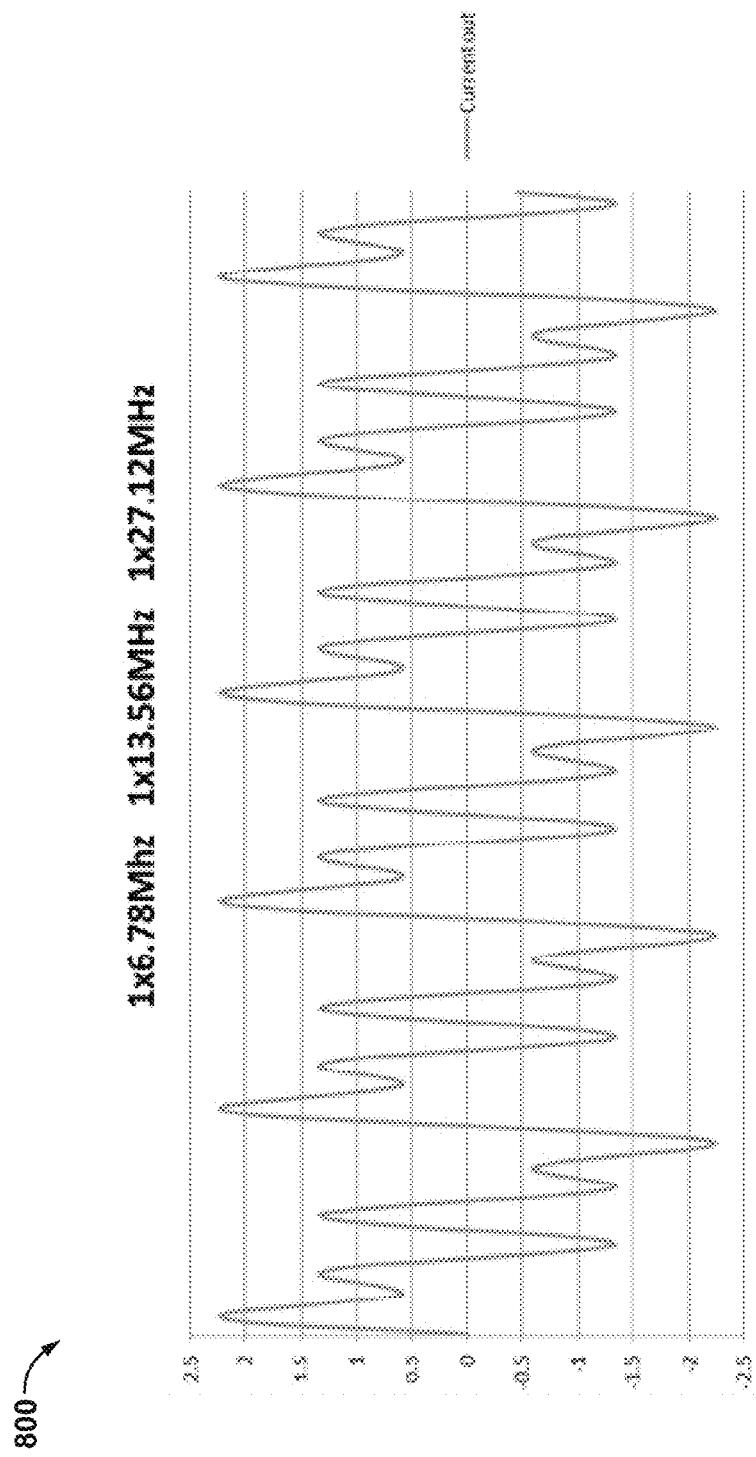
FIG. 8 is a chart of an exemplary transmit current waveform, in accordance with one embodiment.

FIG. 8 is a chart 800 of an exemplary transmit current waveform of the PTU 402, in accordance with one embodiment. As shown in FIG. 8, the y-axis of the chart 800 represents the amplitude of the transmit resonator (e.g., power transmitting element 214) current in amperes and the x-axis represents time in seconds. In this example, the chart 800 illustrates equal amplitude 6.78 MHz, 13.56 MHz, and 27.12 MHz current waveforms that are combined to power a mixed set of PRUs. In this case, in connection with FIG. 4, the PTU 402 may be powering the PRU 406 (e.g., laptop or tablet) at 6.78 MHz, the PRU 407 (e.g., a phone) at 13.56 MHz and the PRU 408 (e.g., a headset) at 27.12 MHz. The relative powers provided to each PRU can then be adjusted as discussed above to optimize voltage at each PRU. In the example shown in FIG. 8, the transmitter 204 is providing the same magnitude of magnetic field at 27.12 MHz as it is providing at 6.78 MHz or 13.56 MHz.

Figure 9:
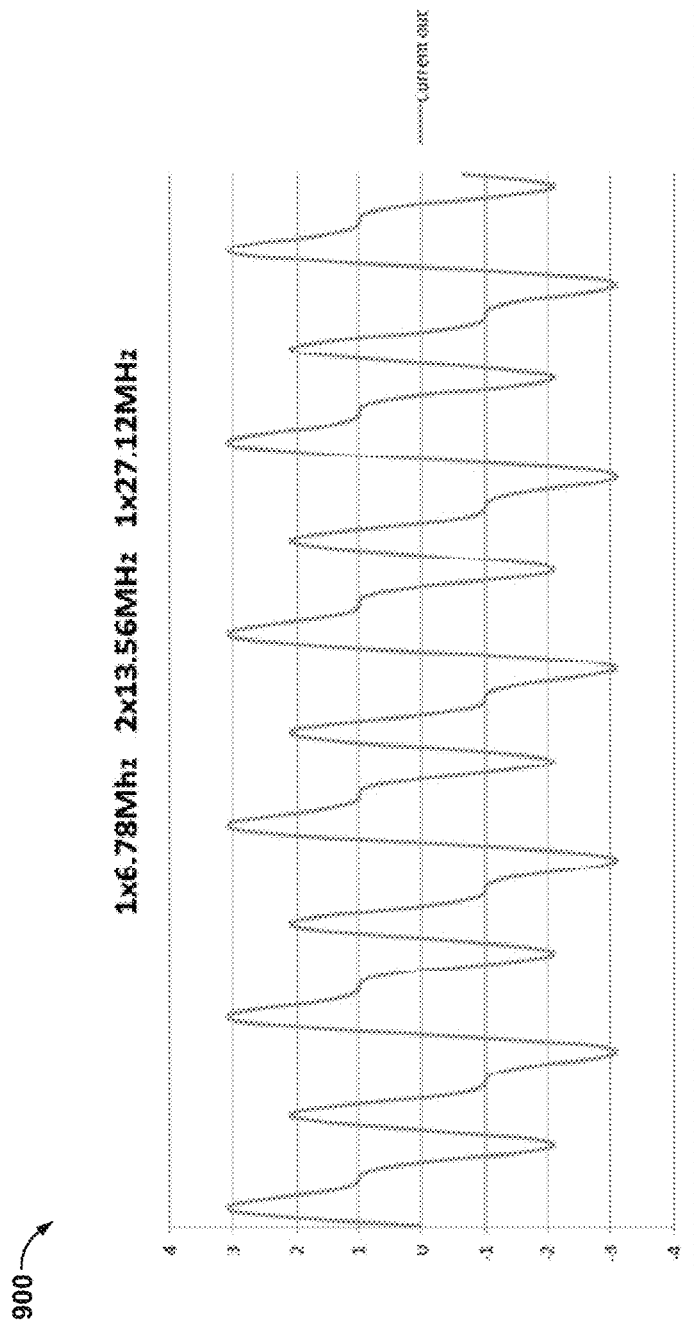
FIG. 9 is a chart of another exemplary transmit current waveform, in accordance with one embodiment.

FIG. 9 is a chart 900 of an exemplary transmit current waveform of the PTU 402, in accordance with one embodiment. As shown in FIG. 9, the y-axis of the chart 900 represents the amplitude of the current in amperes and the x-axis represents time in seconds. In this example, the chart 900 illustrates 6.78 MHz, 13.56 MHz, and 27.12 MHz current waveforms that are combined to power a mixed set of PRUs. In this example and in connection with FIG. 4, the PTU 402 is powering the PRU 406 (e.g., laptop or tablet) at 6.78 MHz and the PRU 408 (e.g., a headset) at 27.12 MHz. In some aspects, it may be desirable for the PTU 402 to be able to detect an RFID card being placed on the surface of or close to the PTU 402 to avoid damage to the RFID card. Therefore, even though there is no device using 13.56 MHz power, the PTU 402 may increase the power level at 13.56 MHz to create a detection field, as shown FIG. 9 by the larger amplitude at 13.56 MHz. When an RFID device is brought near the charging field, it will see a strong 13.56 MHz signal some distance from the PTU 402. For example, the 13.56 MHz frequency may contain modulation that queries any nearby RFID cards (e.g., an ASK signal). When the RFID card sees this signal it will respond (e.g., transmit a REQA request) and be detected by the PTU 402. Once the PTU 402 receives any response from a nearby RFID card it can shut down to prevent damage to the RFID card.

Figure 10:
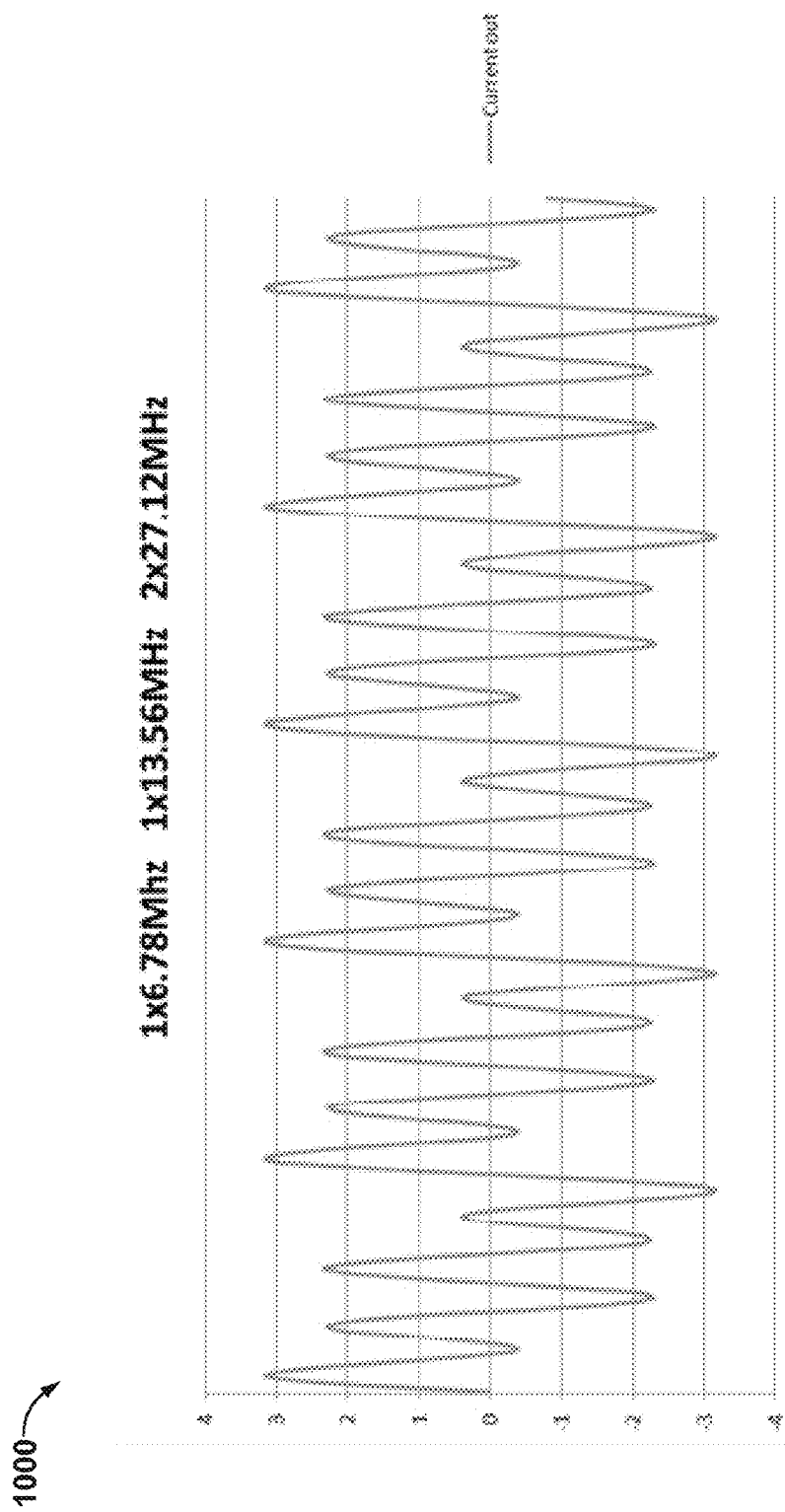
FIG. 10 is a chart of another exemplary transmit current waveform, in accordance with one embodiment.

FIG. 10 is a chart 1000 of an exemplary transmit current waveform of the PTU 402, in accordance with one embodiment. As shown in FIG. 10, the y-axis of the chart 1000 represents the amplitude of the current in amperes and the x-axis represents time in seconds. In this example, the chart 1000 illustrates equal amplitude 6.78 MHz, 13.56 MHz, and 27.12 MHz current waveforms that are combined to power a mixed set of PRUs. In this case, in connection with FIG. 4, the PTU 402 may be powering the PRU 406 (e.g., laptop or tablet) at 6.78 MHz, the PRU 407 (e.g., a phone) at 13.56 MHz and the PRU 408 (e.g., a headset) at 27.12 MHz. However, the PRU 408 may be placed at a poor coupling location and needs more voltage to be able to charge. The processor 522 may detect that the voltage transferred is low (through an in-band signaling of wireless field 205 or an out-of-band communication channel 219) and increases the amplitude of the 27.12 MHz signal. This increase in amplitude increases the voltage at the PRU 408 and allows it to charge without affecting the other devices.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present application is not intended to be limited to the embodiments shown herein but is to be accorded the widest scope consistent with the principles and novel features disclosed herein.

What is claimed is:

1. An apparatus for wirelessly transmitting power to power or charge a wireless power receiver, the apparatus comprising:
   a transmitter circuit configured to transmit wireless power via a magnetic field at a first frequency and a second frequency, the second frequency different than the first frequency and is an integer multiple of the first frequency; and
   a processor circuit operationally coupled to the transmitter circuit and configured to:
      detect a presence of multiple wireless power receivers each being capable of receiving power via the magnetic field at the first and/or the second frequency, and
      identify a frequency charging capability for each of the detected wireless power receivers,
   wherein the transmitter circuit is further configured to transmit wireless power to a first wireless power receiver of the detected wireless power receivers at the first frequency and concurrently transmit wireless power to a second wireless power receiver of the detected wireless power receivers at the second frequency based on the respective frequency charging capability of the first and second wireless power receivers.

2. The apparatus of claim 1, wherein the transmitter circuit is further configured to transmit wireless power sufficient to power or charge a load of the first and second wireless power receivers.

3. The apparatus of claim 1, wherein the processor circuit is further configured to:
   assign the first frequency to the first wireless power receiver of the detected wireless power receivers based on the frequency charging capability of the first wireless power receiver, and
   assign the second frequency to the second wireless power receiver of the detected wireless power receivers based on the charging capability of the second wireless power receiver.

4. The apparatus of claim 1, wherein the frequency charging capability of the first wireless power receiver specifies one or more frequencies at which the first wireless power receiver is capable of receiving power and wherein the frequency charging capability of the second wireless power receiver specifies one or more frequencies at which the second wireless power receiver is capable of receiving power.

5. The apparatus of claim 1, wherein the transmitter circuit is further configured generate the magnetic field at one of the first and second frequencies for detecting a radio frequency identification (RFID) device.

6. The apparatus of claim 5, further comprising a receiver circuit configured to receive a communication from the detected RFID device in response to the magnetic field provided at one of the first and second frequencies.

7. The apparatus of claim 1, wherein the processor circuit is further configured to:
   assign the first frequency to a third wireless power receiver based on a frequency charging capability of the third wireless power receiver,
   compare a frequency charging capability of the first wireless power receiver with a frequency charging capability of the third wireless power receiver, and
   assign the second frequency to the first wireless power receiver based on the comparison.

8. The apparatus of claim 7, wherein the frequency charging capability of the first wireless power receiver specifies a required received voltage level of the first wireless power receiver and wherein the frequency charging capability of the third wireless power receiver specifies a required received voltage level of the third wireless power receiver.

9. The apparatus of claim 1, wherein the transmitter circuit comprises a first coil configured to provide the magnetic field at the first frequency and a second coil configured to provide the magnetic field at the second frequency.

10. The apparatus of claim 1, wherein the transmitter circuit comprises a frequency generator configured to:
    electrically sum the first frequency and the second frequency, and
    provide the magnetic field at the summed frequency.

11. The apparatus of claim 1, wherein the transmitter circuit comprises an amplifier configured to provide the magnetic field at the first frequency and the second frequency.

12. The apparatus of claim 1, wherein the transmitter circuit comprises a frequency generator configured to provide the magnetic field at the first frequency and the second frequency based on inducing distortion.

13. The apparatus of claim 1, wherein the transmitter circuit comprises a harmonic generator circuit configured to provide one or more harmonics of the first frequency to provide the magnetic field at the one or more harmonics of the first frequency.

14. A method of wirelessly transmitting power to power or charge a wireless power receiver, comprising:
  detecting a presence of multiple wireless power receivers each being capable of receiving power via a magnetic field at a first and/or a second frequency, the second frequency different than the first frequency and is an integer multiple of the first frequency;
  identifying a frequency charging capability for each of the detected wireless power receivers;
  transmitting wireless power via the magnetic field to a first wireless power receiver of the detected wireless power receivers at the first frequency based on the frequency charging capability of the first wireless receiver; and
  concurrently transmitting wireless power via the magnetic field to a second wireless power receiver of the detected wireless power receivers at the second frequency based on the frequency charging capability of the second wireless power receiver.

15. The method of claim 14, further comprising:
  assigning the first frequency to the first wireless power receiver of the detected wireless power receivers based on the frequency charging capability of the first wireless power receiver; and
  assigning the second frequency to the second wireless power receiver of the detected wireless power receivers based on the frequency charging capability of the second wireless power receiver.

16. The method of claim 14, wherein the frequency charging capability of the first wireless power receiver specifies one or more frequencies at which the first wireless power receiver is capable of receiving power and wherein the frequency charging capability of the second wireless power receiver specifies one or more frequencies at which the second wireless power receiver is capable of receiving power.

17. The method of claim 14, further comprising transmitting wireless power at one of the first and second frequencies to detect a radio frequency identification (RFID) device.

18. The method of claim 17, further comprising receiving a communication from the detected RFID device in response to the magnetic field transmitted at one of the first and second frequencies.

19. The method of claim 14, further comprising:
  assigning the first frequency to a third wireless power receiver based on a frequency charging capability of the third wireless power receiver;
  comparing the frequency charging capability of the first wireless power receiver with the frequency charging capability of the third wireless power receiver; and
  assigning the second frequency to the first wireless power receiver based on the comparison.

20. The method of claim 14, wherein transmitting wireless power via the magnetic field to the first and second wireless power receivers comprises:
  electrically summing the first frequency and the second frequency, and
  providing the magnetic field at the summed frequency.

21. The method of claim 14, further comprising:
  altering a waveform based on the first frequency;
  producing one or more harmonics of the first frequency based on altering the waveform; and
  providing the magnetic field at the one or more harmonics of the first frequency.

22. An apparatus for wirelessly transmitting power to power or charge a wireless power receiver, the apparatus comprising:
  means for detecting a presence of multiple wireless power receivers each being capable of receiving power via a magnetic field at a first and/or a second frequency, the second frequency different than the first frequency and is an integer multiple of the first frequency;
  means for identifying a frequency charging capability of each of the detected wireless power receivers;
  means for transmitting wireless power via the magnetic field to a first wireless power receiver of the detected wireless power receivers at the first frequency based on the frequency charging capability of the first wireless receiver; and
  means for concurrently transmitting wireless power via the magnetic field to a second wireless power receiver of the detected wireless power receivers at the second frequency based on the frequency charging capability of the second wireless power receiver.

23. The apparatus of claim 22, further comprising:
  means for assigning the first frequency to the first wireless power receiver of the detected wireless power receivers based on the frequency charging capability of the first wireless power receiver;
  means for assigning the second frequency to the second wireless power receiver of the detected wireless power receivers based on the charging capability of the second wireless power receiver.

24. The apparatus of claim 22, wherein the frequency charging capability of the first wireless power receiver specifies one or more frequencies at which the first wireless power receiver is capable of receiving power and wherein the frequency charging capability of the second wireless power receiver specify one or more frequencies at which the second wireless power receiver is capable of receiving power.

25. The apparatus of claim 22, further comprising means for generating the magnetic field at one of the first and second frequencies for detecting a radio frequency identification (RFID) device via the magnetic field.

26. The apparatus of claim 25, further comprising means for receiving a communication from the detected RFID device in response to the magnetic field transmitted at one of the first and second frequencies.

27. An apparatus for wirelessly transmitting power to power or charge a wireless power receiver, the apparatus comprising:
  a transmitter circuit configured to transmit wireless power via a magnetic field at a first frequency and a second frequency, the second frequency different than the first frequency and is an integer multiple of the first frequency; and
  a processor circuit operationally coupled to the transmitter circuit and configured to:

detect a presence of multiple wireless power receivers each being capable of receiving power via the magnetic field at the first and/or the second frequency, and wherein the transmitter circuit is further configured to transmit wireless power to a first wireless power receiver of the detected wireless power receivers at the first frequency and concurrently transmit wireless power to a second wireless power receiver of the detected wireless power receivers at the second frequency.

28. The apparatus of claim 27, wherein the transmitter circuit is further configured to transmit wireless power sufficient to power or charge a load of the first and second wireless power receivers.

29. The apparatus of claim 27, wherein the transmitter circuit is further configured generate the magnetic field at one of the first and second frequencies for detecting a radio frequency identification (RFID) device.

30. The apparatus of claim 27, wherein the transmitter circuit comprises a harmonic generator configured to alter a waveform driving the transmitter circuit to provide the magnetic field at the first frequency and the second frequency.

* * * * *